United States Patent
Lemmers, Jr. et al.

(10) Patent No.: US 7,882,691 B2
(45) Date of Patent: Feb. 8, 2011

(54) HIGH TO LOW PRESSURE SPOOL SUMMING GEARBOX FOR ACCESSORY POWER EXTRACTION AND ELECTRIC START

(75) Inventors: Glenn C. Lemmers, Jr., Loves Park, IL (US); David S. Behling, Belvidere, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 886 days.

(21) Appl. No.: 11/773,471

(22) Filed: Jul. 5, 2007

(65) Prior Publication Data
US 2009/0007569 A1 Jan. 8, 2009

(51) Int. Cl.
*F02C 1/00* (2006.01)
*F02C 3/10* (2006.01)

(52) U.S. Cl. .................. 60/39.163; 60/802; 74/664; 475/6

(58) Field of Classification Search .................. 60/792, 60/802, 39.163, 786, 788; 74/664, 665 R, 74/661, 665 L, 665 M, 665 N; 475/6, 9, 475/10, 302, 207, 218
See application file for complete search history.

(56) References Cited

U.S. PATENT DOCUMENTS

| | | | |
|---|---|---|---|
| 3,286,543 A | 11/1966 | Porter | |
| 4,121,138 A | 10/1978 | Flint et al. | |
| 4,507,915 A | 4/1985 | Evans | |
| 4,593,523 A | 6/1986 | Hawes | |
| 4,776,163 A | 10/1988 | Brockmann | |
| 5,097,658 A | 3/1992 | Klaass et al. | |
| 5,309,029 A | 5/1994 | Gregory et al. | |
| 5,349,814 A | 9/1994 | Ciokajlo et al. | |
| 5,694,765 A | 12/1997 | Hield et al. | |
| 5,806,805 A | 9/1998 | Elbert et al. | |
| 6,080,074 A | 6/2000 | Ulbrich et al. | |
| 6,158,210 A | 12/2000 | Orlando | |
| 6,467,725 B1 | 10/2002 | Coles et al. | |
| 6,672,049 B2 | 1/2004 | Franchet et al. | |

(Continued)

FOREIGN PATENT DOCUMENTS

GB  2 197 391  5/1988

OTHER PUBLICATIONS

United Kingdom Search Report for UK Application No. GB0808830.4, Sep. 10, 2008.

*Primary Examiner*—William H Rodriguez
(74) *Attorney, Agent, or Firm*—Carlson, Gaskey & Olds, P.C.

(57) ABSTRACT

A turbine engine includes low and high pressure spools. A high power take-off shaft is coupled to the high spool. An auxiliary component, such as a generator, is configured to be driven by the high power take-off shaft at a first speed. The low spool, in part, drives the auxiliary component, for example, by interconnecting the high power take-off shaft to a lower power take-off shaft through a speed summing gearbox. The gearbox drives the auxiliary component and increases the rotational speed of the auxiliary component from the first speed to the second speed. The low power take-off shaft also drives another generator, in one example. The turbine engine can be started by the low pressure generator, for example, in response to a command from a controller, which transforms the generator into a starter motor.

9 Claims, 2 Drawing Sheets

U.S. PATENT DOCUMENTS 6,825,640 B1    11/2004  Hill et al.
7,246,482 B2 *  7/2007   Mahoney et al. ............... 60/204
7,481,062 B2 *  1/2009   Gaines et al. ................. 60/792
7,552,582 B2 *  6/2009   Eick et al. ................. 60/39.163
2007/0137219 A1  6/2007  Linet et al.

* cited by examiner

HIGH TO LOW PRESSURE SPOOL SUMMING GEARBOX FOR ACCESSORY POWER EXTRACTION AND ELECTRIC START

BACKGROUND

The application relates to an arrangement for interconnecting low and high speed turbine engine spools with a speed summing gearbox, for example, to increase the speed of a high pressure generator and/or start the turbine engine.

An increasing number of airplanes require significant electric power for operation. Typically, a generator is driven by a high pressure spool through a power takeoff shaft. Due to modern airplane engine efficiency requirements, the electric power demand is increasing beyond the power extraction potential of the engine high pressure spool. That is, the efficiency provided by the high pressure spool drops to an unacceptable level if the generator is to be driven to provide a needed amount of electric power.

Power extraction is available from the low pressure spool of the engine, but the speed range is significantly higher than the high pressure spool (for example, approximately 5:1 for the low pressure spool and 2.22:1 for the high pressure spool). As a result, generators must be specially designed for use with the wider speed range low spool to achieve the desired electrical output from a low spool-driven generator. Airplane and engine manufacturers are looking for ways to extract electric power and other accessory power from the low pressure spool in a cost effective and efficient manner.

SUMMARY

A turbine engine includes low and high pressure spools. A high power take-off shaft is coupled to the high spool. An auxiliary component, such as a generator, is configured to be driven by the high power take-off shaft at a first speed. The low spool, in part, drives the auxiliary component, for example, by interconnecting the high power take-off shaft to a lower power take-off shaft through a speed summing gearbox. The gearbox drives the auxiliary component and increases the rotational speed of the auxiliary component from the first speed to the second speed.

The low power take-off shaft also drives another generator, in one example. The turbine engine can be started by the low pressure generator, for example, in response to a command from a controller, which transforms the generator into a starter motor. In one example, the gearbox includes a rotationally driven hydraulic unit coupled between the low and high power take-off shafts.

These and other features of the application can be best understood from the following specification and drawings, the following of which is a brief description.

DETAILED DESCRIPTION OF THE PREFERRED EMBODIMENT

Figure 1:
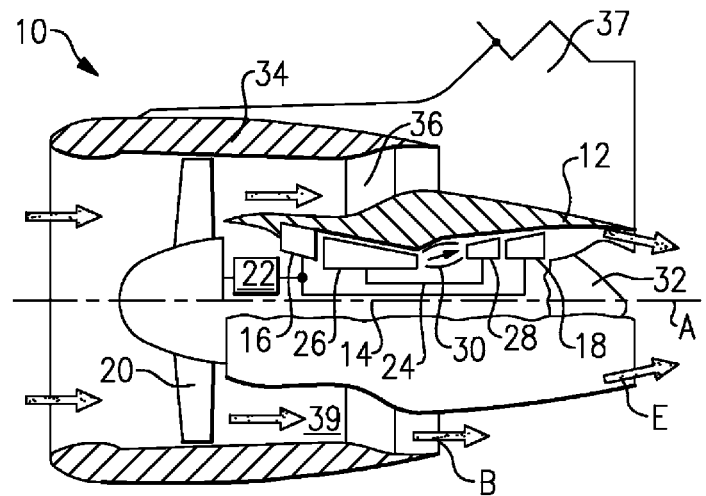
FIG. 1 is a cross-sectional view of one type of turbine engine.

A geared turbofan engine 10 is shown in FIG. 1. As known, a fan section moves air and rotates about an axis A. A compressor section, a combustion section, and a turbine section are also centered on the axis A. FIG. 1 is a highly schematic view, however, it does show the main components of the gas turbine engine. Further, while a particular type of gas turbine engine is illustrated in this figure, it should be understood that the claim scope extends to other types of gas turbine engines.

A pylon 37 supports the engine 10 on an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a fan 20 through a gear train 22. However, the fan 20 may be driven directly in some types of engines. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The bypass flow B within the bypass flow path 39 exits the aft of the fan nacelle 34.

Figure 2:
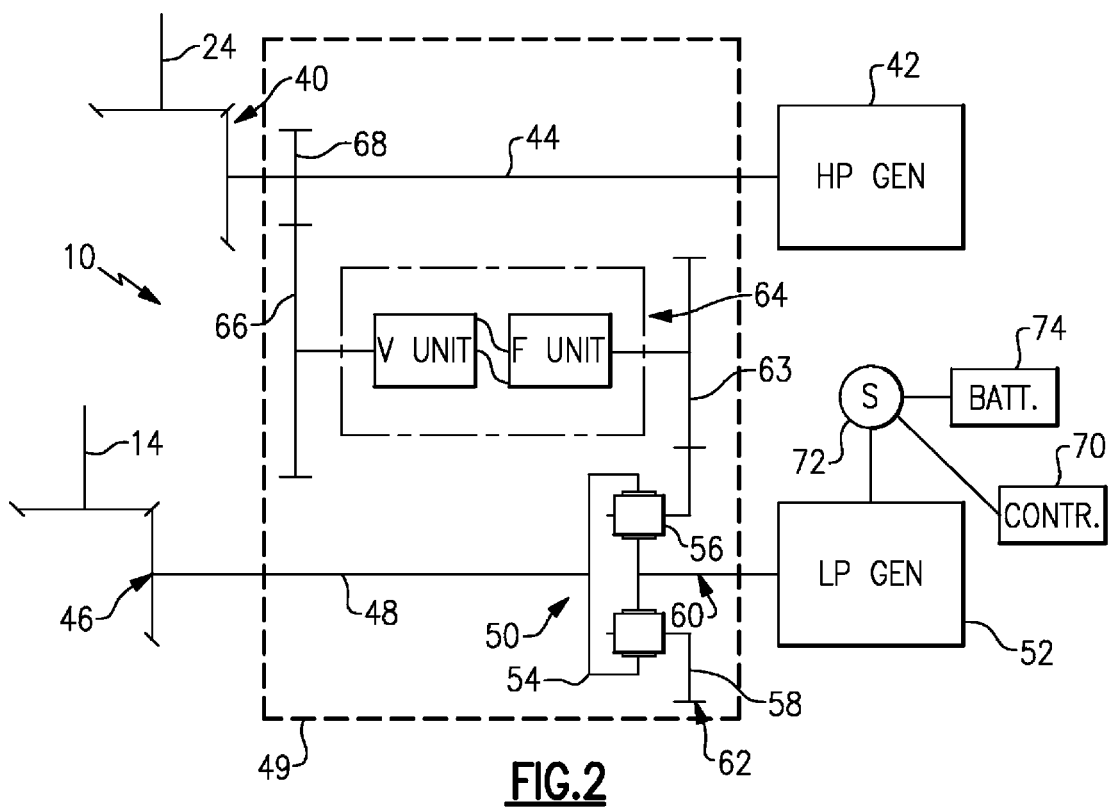
FIG. 2 is a schematic view of one example gearbox providing speed summing between the low and high power take-off shafts.

An example arrangement is shown in FIG. 2 in which gear summing is used to increase the rotational speed of a generator driven by the high spool 24. An example gearbox 49 enables the same generator to be driven by each of the low and high pressure spools 14, 24 to reduce manufacturing and maintenance costs. Moreover, the engine 10 can be started using a low pressure generator according to one example embodiment.

A first auxiliary component, such as high pressure generator 42, is driven by a high power take-off shaft 44 coupled to the high spool 24 by a bevel gear set 40. In one example, the rotational input speed of the high pressure generator 42 is between 10,800-24,000 rpm.

The low spool 14 rotationally drives a second auxiliary component, such as a low pressure generator 52, through the gearbox 49. The input speed of the low spool 14 provided to a low power take-off shaft 48 is between 2,500-12,500 rpm in one example. The low spool 14 and low power take-off shaft 48 are coupled by a bevel gear set 46. An epicyclic gear train 50 increases the rotational speed provided by the low power take-off shaft 48 such that the low pressure generator 52 rotates at a speed of between 10,800-24,000 rpm in one example. In this manner, the same part can be used for both the high and low pressure generators 42, 52.

In one example, the epicyclic gear train 50 includes a ring gear 54 rotationally driven by the power take-off shaft 48. The ring gear 54 rotationally drives planetary gears 56 mounted to a carrier 58. The planetary gears 56 rotationally drive a sun gear 60 that is coupled to the low pressure generator 52. As a result, the rotational speed provided from the power take-off shaft 48 to the low pressure generator 52 is increased by the epicyclic gear train 50.

The carrier 58 supports a drive gear 62 rotationally driving a driven gear 63. In the example shown in FIG. 2, the driven gear 63 provides rotational drive through an output gear 66 to a gear 68 associated with the high power take-off shaft 44. As a result, speed summing is provided by the gearbox 49. That is, the rotational speed of the high power take-off shaft 44 is increased by the rotational speed provided through the output gear 66.

Figure 3:
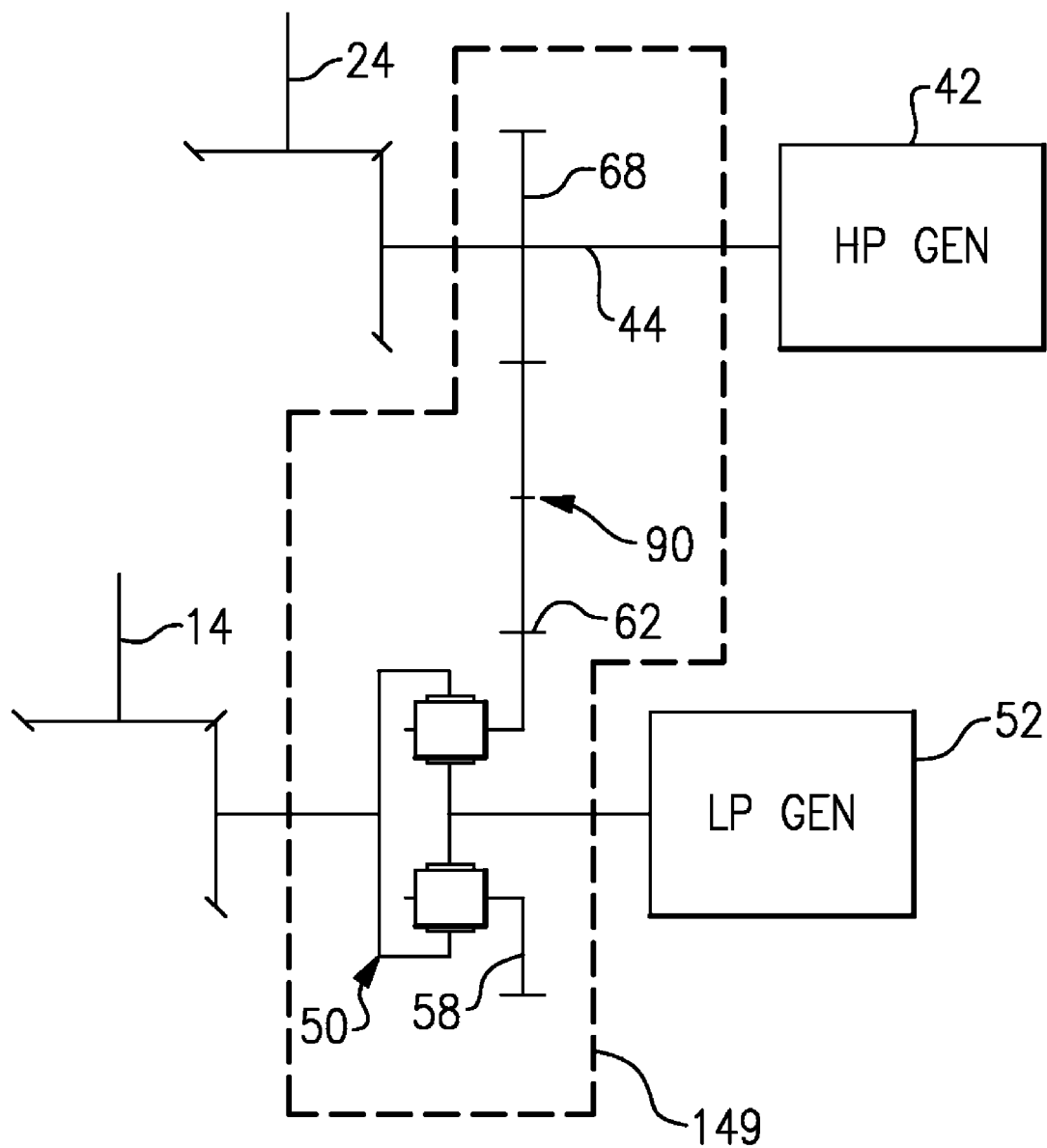
FIG. 3 is another example gearbox configuration.

In the example shown in FIG. 2, an auxiliary component, such as hydraulic unit 64, is provided between the driven gear 63 and the output gear 66. In this manner, additional power can be extracted from the low spool 14. The hydromechanical generator 64 is capable of being driven at a variable frequency, for example, between 360-800 Hertz. Further, it should be understood that any intermediate unit arranged between the epicyclic gear train 50 and the gear 68 can be eliminated. For example, referring to FIG. 3, an idler gear 90 may be provided between the drive gear 62 and the gear 68 to more directly drive the high power take-off shaft 44 and provide the desired rotation.

Returning to FIG. 2, the low pressure generator 52 can be used to start the engine 10. Typically, the engine 10 can only be started using the high pressure spool 24, for example, using a dedicated starter or the high pressure generator 42. With the low pressure generator 52 coupled to the high power take-off shaft 44 through the gearbox 49, the low pressure generator 52 can rotationally drive the high spool 24. Driving either of the spools 14, 24 with one of the generators 42, 52 during engine operation can improve surge margins and fuel consumption, for example. A controller 70, for example, commands a switch 72 to provide power from a source 74 to the low pressure generator 52 to initiate a starting procedure for the engine 10.

Although a preferred embodiment has been disclosed, a worker of ordinary skill in this art would recognize that certain modifications would come within the scope of the claims. For that reason, the following claims should be studied to determine their true scope and content.

What is claimed is:

1. A turbine engine comprising:
   low and high pressure spools;
   a high power take-off shaft coupled to the high pressure spool;
   a first auxiliary component configured to be driven by the high power take-off shaft at a first speed;
   a gearbox interconnecting the low pressure spool to the first auxiliary component, the gearbox configured to drive the first auxiliary component at a second speed greater than the first speed;
   a low power take-off shaft coupled to the low pressure spool and a second auxiliary component configured to be driven by the low power take-off shaft;
   wherein the gearbox interconnects the low and high power take-off shafts; and
   wherein the gearbox includes an epicyclic gear train configured to receive a rotational input from the low power take-off shaft for increasing a rotational speed provided to the second auxiliary component.

2. The turbine engine according to claim 1, wherein the epicyclic gear train includes a ring gear driven by the low power take-off shaft, the ring gear providing rotational input to planetary gears supported by a carrier, the carrier coupled to the high power take-off shaft, and a sun gear receiving rotational drive from the planetary gears, the sun gear providing rotational input to the second auxiliary component.

3. The turbine engine according to claim 2, wherein the high power take-off shaft supports a gear for transmitting additional speed from the gearbox to the high power take-off shaft.

4. The turbine engine according to claim 3, comprising an idler gear interconnecting the gear and a driven gear supported by the carrier.

5. The turbine engine according to claim 3, comprising a third auxiliary component interconnecting the gear and a driven gear supported by the carrier.

6. The turbine engine according to claim 5, wherein the third auxiliary component is a hydromechanical generator.

7. The turbine engine according to claim 1, wherein the first auxiliary component is a first generator.

8. The turbine engine according to claim 1, wherein the second auxiliary component is a second generator.

9. The turbine engine according to claim 8, comprising a controller providing a command to the second generator for selectively rotating the high pressure spool through the gearbox with the second generator in a start procedure.

\* \* \* \* \*